US012587946B2

(12) United States Patent
Huang et al.

(10) Patent No.: US 12,587,946 B2
(45) Date of Patent: Mar. 24, 2026

(54) METHODS AND SYSTEMS FOR EXCHANGING INFORMATION IN AN INTEGRATED ACCESS AND BACKHAUL SYSTEM

(71) Applicant: ZTE Corporation, Shenzhen (CN)

(72) Inventors: Ying Huang, Shenzhen (CN); Lin Chen, Shenzhen (CN)

(73) Assignee: ZTE Corp., Shenzhen (CN)

( * ) Notice: Subject to any disclaimer, the term of this patent is extended or adjusted under 35 U.S.C. 154(b) by 394 days.

(21) Appl. No.: 18/097,120

(22) Filed: Jan. 13, 2023

(65) Prior Publication Data

US 2023/0156565 A1      May 18, 2023

Related U.S. Application Data

(63) Continuation of application No. PCT/CN2020/105775, filed on Jul. 30, 2020.

(51) Int. Cl.
*H04W 40/36*          (2009.01)
*H04L 1/1607*          (2023.01)

(52) U.S. Cl.
CPC ........... *H04W 40/36* (2013.01); *H04L 1/1642* (2013.01)

(58) Field of Classification Search
CPC ..... H04W 40/36; H04W 36/02; H04W 72/29; H04L 1/1642
See application file for complete search history.

(56) References Cited

U.S. PATENT DOCUMENTS

| | | | | |
|---|---|---|---|---|
| 2020/0053629 A1* | 2/2020 | Majmundar | .......... | H04W 40/36 |
| 2021/0377980 A1* | 12/2021 | Fujishiro | .............. | H04W 88/14 |
| 2023/0269644 A1* | 8/2023 | Teyeb | ................... | H04W 36/10 |
| | | | | 370/331 |

FOREIGN PATENT DOCUMENTS

| | | |
|---|---|---|
| CN | 110536377 | 12/2019 |
| CN | 111093286 | 5/2020 |
| GB | 2587653 | 4/2023 |
| WO | 2019/245442 | 12/2019 |
| WO | 2020/027491 | 2/2020 |
| WO | 2020/031154 | 2/2020 |
| WO | 2020/039346 | 2/2020 |
| WO | 2020/067736 | 4/2020 |
| WO | 2020/076631 A1 | 4/2020 |
| WO | 2020/087445 | 5/2020 |
| WO | 2020/092596 A1 | 5/2020 |

OTHER PUBLICATIONS

First Examination Report for Co-Pending IN Application No. 202317002721, Mail Date: Aug. 21, 2024, 6 pages.
Office Action for Co-Pending CN Application No. 202080104758.3, Mail Date: Mar. 14, 2025, 18 pages with google translation.
(Continued)

*Primary Examiner* — Jamal Javaid
(74) *Attorney, Agent, or Firm* — Perkins Coie LLP

(57)          ABSTRACT
Methods, apparatus, and systems for reducing packet loss in wireless systems during handover, where one or more user equipment or mobile terminals are connected to an integrated access and backhaul node. The disclosure relates to continuing uplink (UL) and maintain service continuity in an integrated access and backhaul (IAB) system.

7 Claims, 12 Drawing Sheets

(56)                References Cited

OTHER PUBLICATIONS

"Status Report to TSG" 3GPP TSG RAN meeting #87e, RP-200083, Electronic Meeting, Mar. 16-19, 2020, revision of RP-192518).

ISA, International Search Report for International Application No. PCT/CN2020/105775, Mail Date: Apr. 26, 2021, 7 pages.

CATT, "Clean-up for Intra-CU topology adaption procedure," 3GPP TSG RAN WG3 3107-e, E-meeting, R3-200301, Feb. 24-Mar. 6, 2020. 4 pages.

CATT, "Summary of offline discussion on IAB Migration same donor case," 3GPP TSG RAN WG3 #107-e, E-Meeting, R3-201148, Feb. 24-Mar. 6, 2020. 10 pages.

Huawei, "(TP for NR_IAB BL CR for TS 38.401): Intra IAB donor-CU topology adaptation," 3GPP TSG RAN WG3 #107-e, E-Meeting, R3-200762, Feb. 24-Mar. 6, 2020. 5 pages.

Qualcomm Incorporated, "Integrated Access and Backhaul for NR," 3GPP TSG RAN #84, Newport Beach, US, RP-191454, Jun. 3-6, 2019. 46 pages.

Extended European Search Report for Co-Pending EP Application No. 20946831.3, Mail Date: Nov. 10, 2023, 13 pages.

KIPO, Office Action for Korean Application No. 10-2023-7001589, mailed on Aug. 22, 2025, 8 pages with unofficial English translation.

Kyocera, "Consideration of multi-hop RLC ARQ," 3GPP TSG-RAN WG2 #105, Athens, Greece, R2-1900918, Feb. 25-Mar. 1, 2019, 4 pages.

3GPP TS 38.322 V16.1.0, "3rd Generation Partnership Project; Technical Specification Group Radio Access Network; NR; Radio Link Control (RLC) protocol specification (Release 16)," Jul. 2020, 1-32.

Huawei et al., "Lossless data delivery," 3GPP TSG-RAN WG2 meeting #106, Reno, USA, R2-1906971, May 13-17, 2019, 5 pages.

3GPP TS 38.300 V16.2.0, "3rd Generation Partnership Project; Technical Specification Group Radio Access Network; NR; NR and NG-RAN Overall Description; Stage 2 (Release 16)," Jul. 2020, 1-143.

Second Office Action for Co-Pending CN Application No. 202080104758.3, Mail Date: Jul. 19, 2025, 16 pages with google translation.

Ericsson "End to End Flow Control for IAB Networks" 3GPP TSG-RAN WG2 #104 R2-1816558, Spokane, USA, Nov. 12-16, 2018, 7 pages.

Ericsson "End to End Flow Control in Multi-hop IAB Networks" 3GPP TSG-RAN WG2 #103bis R2-1814360, Chengdu, P. R. China, Oct. 8-12, 2018 7 pages.

Notification to Grant Patent Right for Co-Pending CN Application No. 202080104758.3, Mail Date: Jan. 29, 2026, 8 pages with google translation.

CATT "(TP for NR_IAB BL CR for TS 38.401) Intra-CU IAB-node migration" 3GPP TSG-RAN WG3 #105bis R3-195364, Chongqing, China, Oct. 14-18, 2019, 7 pages.

CATT "Summary of the email discussion [106#43][IAB] Backhaul Rlf" 3GPP TSG-RAN WG2 Meeting #107bis R2-1912127, Chongqing, P. R. China, Oct. 14-18, 2019, 55 pages.

Hearing Notice for Co-Pending Indian Application No. 202317002721k Mail Date: Feb. 6, 2026, 2 pages.

* cited by examiner

METHODS AND SYSTEMS FOR EXCHANGING INFORMATION IN AN INTEGRATED ACCESS AND BACKHAUL SYSTEM

CROSS REFERENCE TO RELATED APPLICATIONS

This patent document is a continuation of and claims benefit of priority to International Patent Application No. PCT/CN2020/105775, filed on Jul. 30, 2020. The entire contents of the before-mentioned patent applications are incorporated by reference as part of the disclosure of this application.

TECHNICAL FIELD

This disclosure is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for communicating in an integrated access and backhaul (IAB) deployment for New Radio (NR).

The following aspects may be preferably implemented in various embodiments.

In an aspect, one or more IAB nodes are communicatively coupled to a first parent node or a second parent node and one or more child nodes, wherein the parent node is communicatively coupled to a first IAB donor Central Unit (CU).

In an aspect, one or more IAB nodes receive a RRCreconfiguration message, or a stop indication, or a handover indication. In yet another aspect, the IAB node sends to a child IAB node sends a stop indication or a handover indication wherein the stop indication or the handover indication indicates that the child node should stop data forwarding. In yet another embodiment, the IAB node is an IAB donor central unit (CU).

In an aspect, one or more IAB nodes, receives a stop indication in a F1AP message, wherein the F1AP message includes a RRCreconfiguration message, and stop the forwarding of User Equipment (UE) data packets.

In an aspect, one or more IAB nodes include a flag in BAP header of the User Equipment (UE) packet, and transmit the UE packet to the next hop, wherein the flag indicates that the next hop ignores the BAP header or selects any net hop or selects any egress backhaul (BH) RLC channel to deliver the packets.

In an aspect, one or more IAB nodes, send uplink (UL) delivery status information to at least one or more child nodes. In yet another aspect, the UL delivery status information comprises sequence numbers (SNs) of one or more packets that are received from one of the one or more child nodes, where the one or more packets have not been sent to the first parent node or have not been confirmed as received by the first parent node. In yet another aspect, the UL delivery status information is sent via a BAP sublayer control PDU or BAP sublayer data unit or a RLC sublayer control PDU. In yet another aspect, the UL delivery status information includes at least one of a RLC SN, a RLC channel ID or Logical Channel (LC) ID, a backhaul (BH) RLC channel ID, or a BAP sublayer SN. In yet another aspect, one or more IAB nodes, send one or more data packets that need to be re-transmitted to at least one of the one or more child nodes, wherein the one or more data packets contain at least one of a source IAB node's BAP address, an access node's BAP address and a flag in a BAP sub header. In yet another aspect, the backhaul RLC channel for transmitting the one or more data packets is configured by donor CU.

In an aspect, one or more IAB nodes receive a UL transfer status from a second IAB donor CU, wherein the UL transfer status is transmitted after the second IAB donor CU receives a SN transfer message, and retransmit packets according to the UL transfer status. In yet another embodiment, the UL transfer status contains at least one of the receive status of the UL PDCP SDU and UL COUNT value of the first missing UL SDU.

In an aspect, one or more IAB nodes include a flag in the GTP-U header of one or more packets, wherein the flag indicates that the packets need to be forwarded to a first IAB donor central unit (CU) and transmit the one or more packets to the next hop.

In another aspect, one or more IAB nodes transmit an end marker via GTP-U layer or F1AP message to a second IAB donor CU after receiving a stop indication in F1AP message. In yet another aspect, the second IAB donor CU sends the end marker to the first IAB donor CU.

In yet another aspect, a donor CU sends to one or IAB nodes a stop indication in a F1AP message, wherein the F1AP message includes a RRCreconfiguration message, wherein the stop indication indicates the one or more IAB nodes to stop the forwarding of User Equipment (UE) data packets.

In yet another embodiment, a IAB node receives from one or more parent IAB nodes, uplink (UL) delivery status information. In yet another embodiment, UL delivery status information comprises sequence numbers (SNs) of one or more packets that are received from one of the one or more child nodes, where the one or more packets have not been sent to the first parent node or have not been confirmed as received by the first parent node. In yet another embodiment, the UL delivery status information is sent via a BAP sublayer control PDU or BAP sublayer data PDU or a RLC sublayer control PDU. In yet another embodiment, the UL delivery status information includes at least one of a RLC SN, a RLC channel ID or Logical Channel (LC) ID, a backhaul (BH) RLC channel ID, or a BAP sublayer SN.

In an aspect, an IAB node receives from one or more IAB nodes, one or more data packets that need to be re-transmitted, wherein the one or more data packets contain at least one of a source IAB node's BAP address, an access node's BAP address and a flag in a BAP subheader. In yet another aspect, the backhaul RLC channel for the one or more data packets is configured by donor CU.

In an aspect, a second IAB donor CU transmits to one or more IAB nodes, a UL transfer status, wherein the UL transfer status is transmitted after the second IAB donor CU receives a SN transfer message from the first IAB donor CU, wherein the one or more IAB nodes are configured to determine which packets need to be retransmitted according to the UL transfer status. In yet another aspect, the UL transfer status contains at least one of the receive status of the UL PDCP SDU and UL COUNT value of the first missing UL SDU.

In yet another aspect, a first IAB donor CU receives from one or more IAB nodes, one or more packets that include a flag in the GTP-U header of the one or more packets, wherein the flag indicates that the packets need to be forwarded to a first IAB donor central unit (CU).

In another aspect, a second IAB donor CU receives an end marker via GTP-U layer or F1AP message, wherein the end marker is usable by a second IAB donor CU to cease forwarding of one or more packets to the first IAB donor CU. In yet another aspect, the second IAB donor CU sends the end marker to the first IAB donor CU.

In aspects of the disclosure, the transmission and reception of messages is performed by various devices, including MT, UE, IAB nodes (e.g., access, migrating, descendant, or ancestor), and IAB donors.

These, and other, aspects are described in the present disclosure.

DETAILED DESCRIPTION

The disclosure relates to wireless systems. More specifically, it relates to reducing packet loss during handover in a IAB deployment.

For instance, an integrated access and backhaul (IAB) system supports wireless backhauling by deploying new radio (NR) cells to reduce the need for wireline transport infrastructure.

The terminating node of the NR backhaul network on the network side is commonly referred to as an IAB donor, which represents a gNB, which is the logical node that has additional functionality to support IAB. An IAB node supports gNB Distributed Unit (gNB-DU) functionality, which allows NR access to user equipment (UE) and next-hop IAB nodes. The IAB node also supports functionality for IAB-MT, which allows connections to the gNB-DU of another IAB node or the IAB donor.

Figure 1:
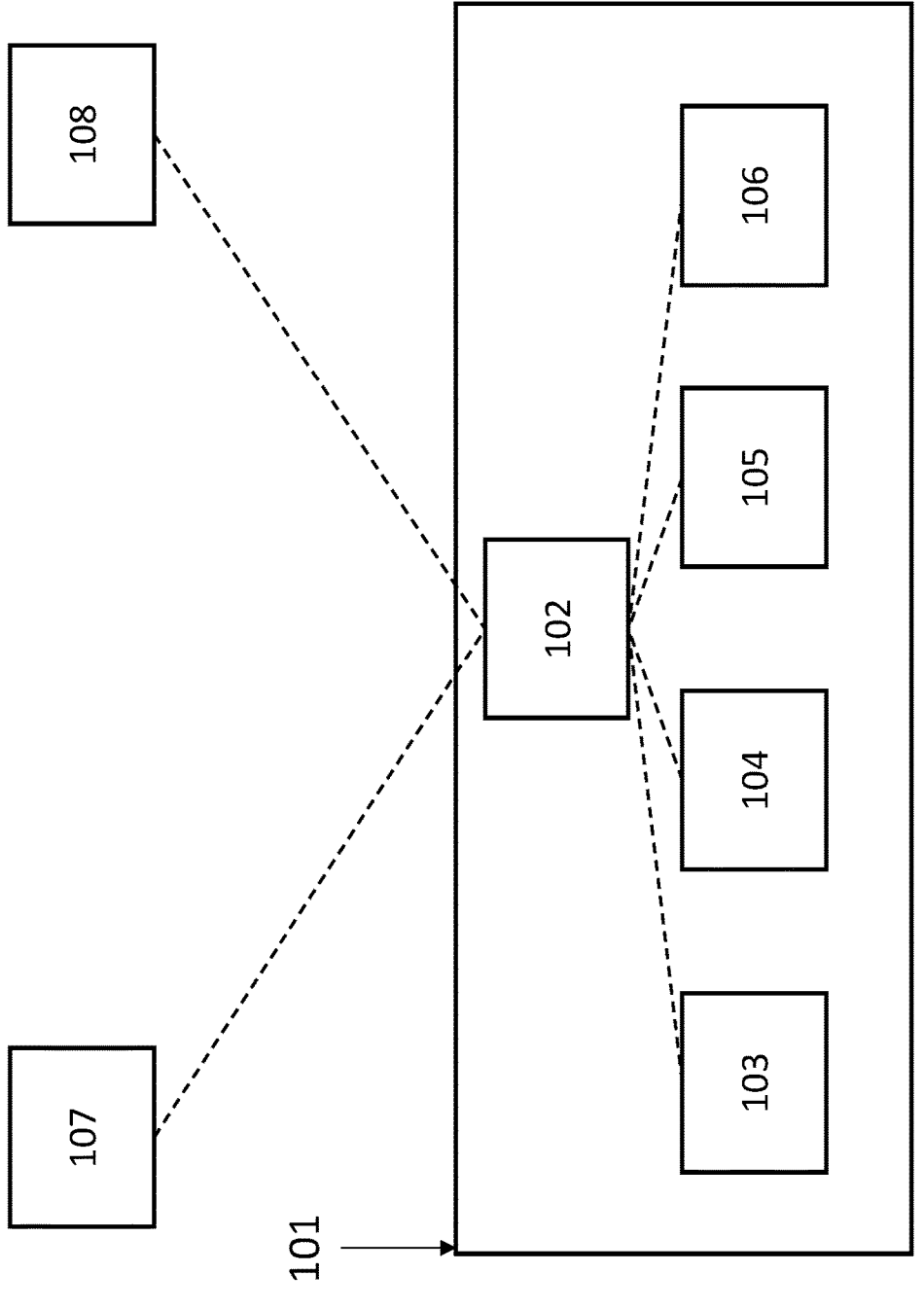
FIG. 1 illustrates an embodiment of an IAB deployment in a moveable vehicle.

In one example, as shown in FIG. 1, a moveable vehicle, such as a high speed train 101 has several passengers with one or more mobile terminal (MT) or user equipment (UE) 103-106. The UE 103-106 are wirelessly connected to an IAB node 102, and the IAB node 102 is in turn connected to a donor node or a parent IAB node 107 or 108. As the high speed train moves, handover between parent IAB nodes occurs. The UE 103-106 accesses the network via the IAB node 102, and the IAB node 102 accesses the network via a parent IAB node. Here, it should be understood that the usage of UE and MT are not mutually exclusive, and one should presume that either term can refer to either a MT or UE. It should also be understood that a parent IAB node should be understood to be encompassed by the term base station. It should be understood that, although a moveable vehicle has been discussed, the techniques disclosed herein are also applicable to static IAB nodes, which may want to perform migration due to load balance or due to Back Haul Radio Link Failure (BH RLF).

The relative positions between the UEs 103-106 and the IAB node 102 will change little as the train 101 travels across. However, the relative position between the IAB node 102 and each IAB donor will change frequently when the train 101 travels.

Consequently, this disclosure provides systems and methods performing handover of the IAB node 102 can be performed. This reduces signaling overhead and improves service continuity.

Figure 2:
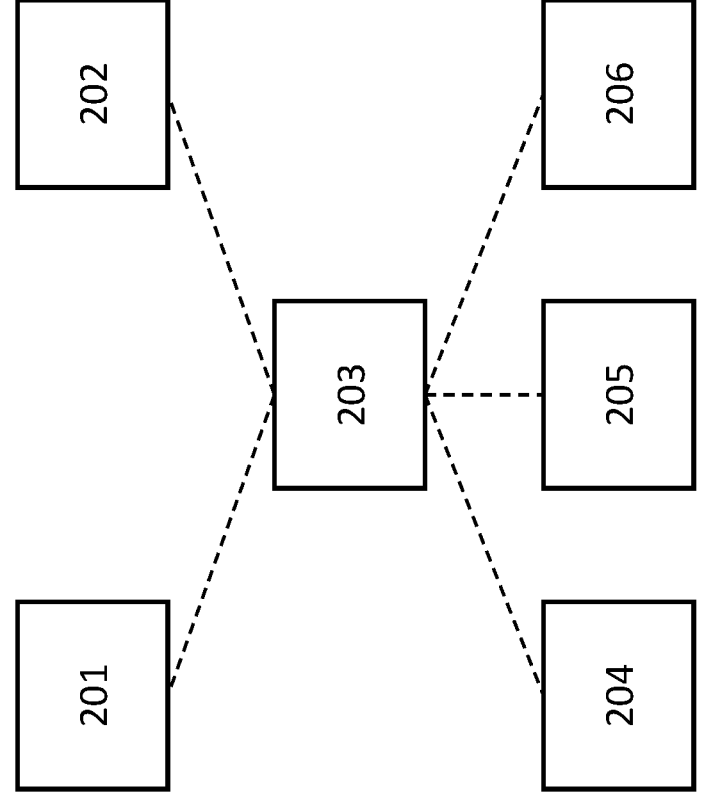
FIG. 2 illustrates an embodiment of an IAB topology.

FIG. 2 illustrates an IAB topology. Parent nodes 201 and 202 have IAB-DU functionality, and they provide NR access to an IAB node 203. IAB node 203 has functionality as both an IAB MT and as an IAB DU. IAB node 203 can connect to parent nodes 201 and 202 as a IAB MT, and also provide access to child nodes 204-206 as a IAB DU. Child nodes 204-206 have functionality of an IAB MT. As can be understood, any node in the topology can work as a donor or a terminal, so long as it is designed with that functionality.

Figure 3:
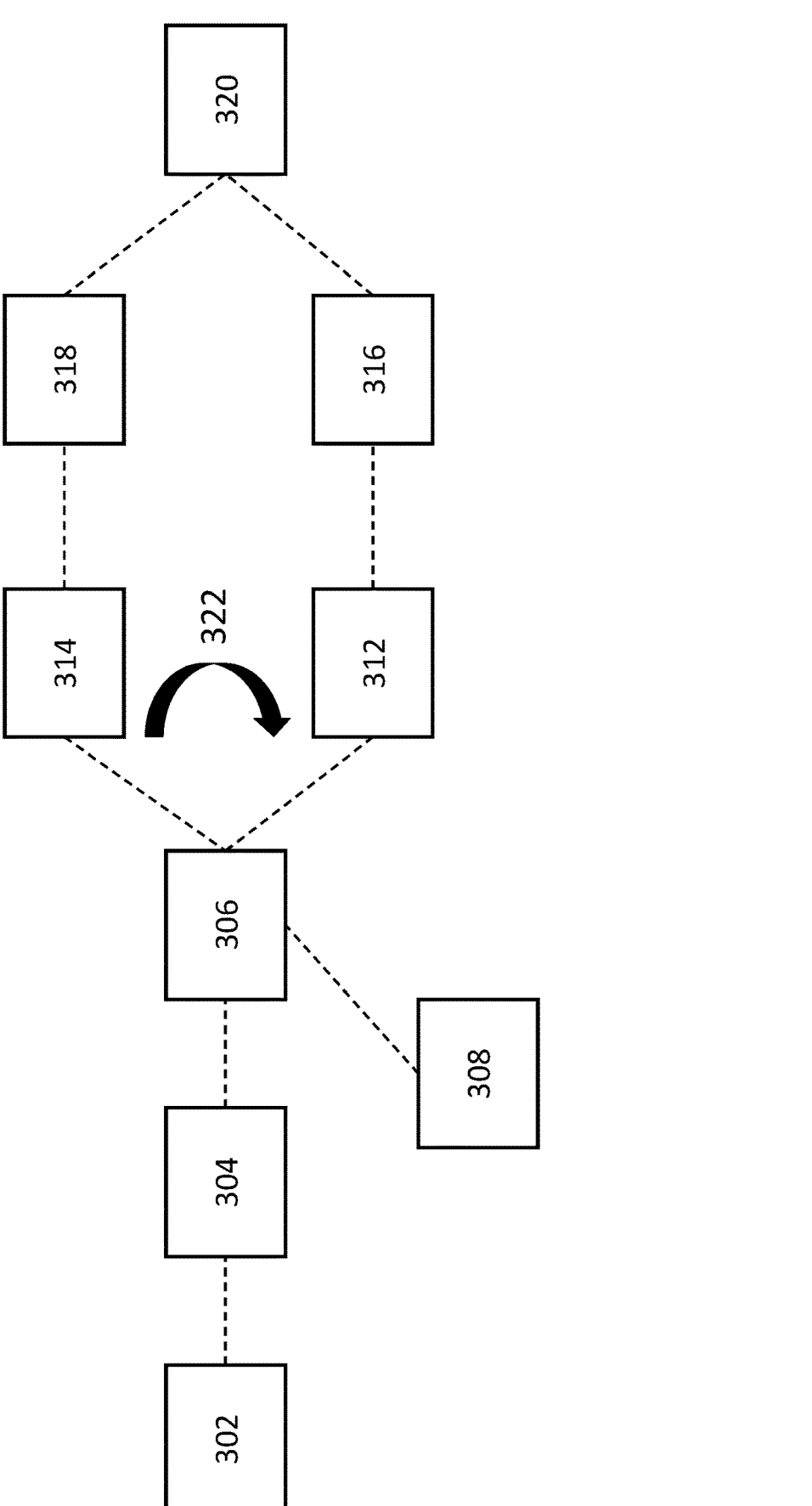
FIG. 3 illustrates an IAB topology where handover of an IAB node is performed.

FIG. 3 illustrates an IAB topology where handover of an IAB node is performed. UE 302 is wirelessly coupled to an IAB node 304, which is wirelessly coupled to IAB node 306. A UE 308 is coupled to IAB node 306. It should be understood that any number of UE or MT can be coupled to any of the IAB nodes.

As denoted from arrow 322, IAB node 306 is migrating from IAB node 314 to IAB node 312. IAB node 314 is coupled to IAB donor DU 318, and IAB node 312 is coupled to IAB donor DU 316. Both IAB donor 318 and 316 are coupled to IAB donor CU.

Figure 4:
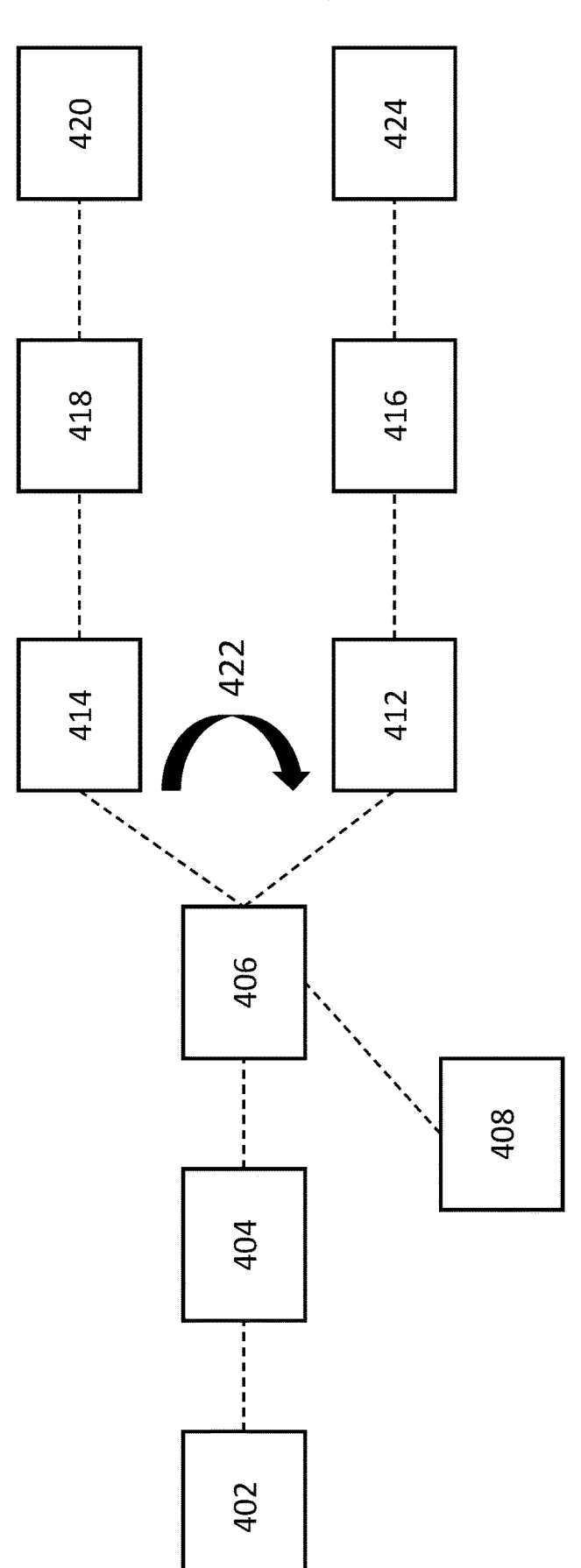
FIG. 4 illustrates an IAB topology where handover of an IAB node is performed.

FIG. 4 illustrates an IAB topology where handover of an IAB node is performed. FIG. 4 differs from FIG. 3 in that there is a second IAB donor CU.

UE 402 is wirelessly coupled to an IAB node 404, which is wirelessly coupled to IAB node 406. A UE 408 is coupled to IAB node 406. It should be understood that any number of UE or MT can be coupled to any of the IAB nodes.

As denoted from arrow 422, IAB node 406 is migrating from IAB node 414 to IAB node 412. IAB node 414 is coupled to IAB donor DU 418, and IAB node 412 is coupled to IAB donor DU 424. Both IAB donor 418 and 416 are coupled to different IAB donor CUs. In the case of FIG. 4, the IAB node 406 not only migrates between IAB nodes, but also between IAB donor CUs.

It should be understood that the topologies disclosed are only exemplary. Any number of nodes, UEs, or donors can exist within an IAB deployment.

The topologies disclosed apply to the embodiments disclosed herein.

Figure 5:
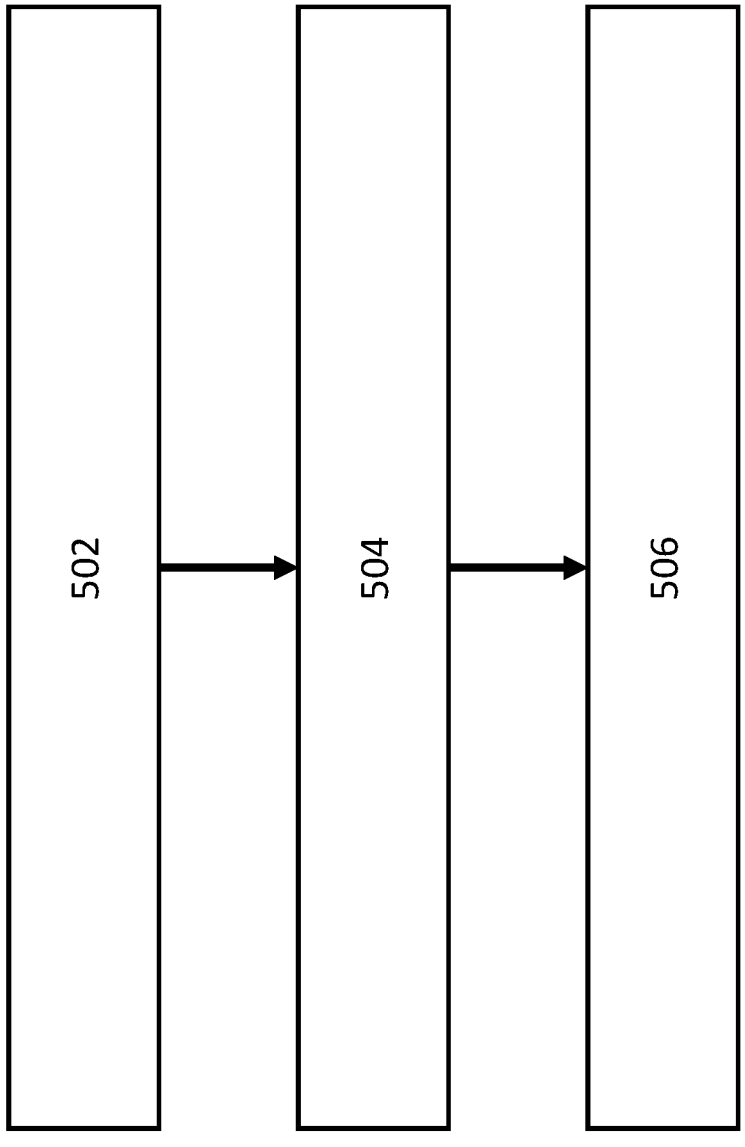
FIG. 5 illustrates an embodiment where UL data transfer of a descendant node or UE is managed.

FIG. 5 illustrates an embodiment where UL data transfer of a descendant node or UE is managed. In step 502 an RRCreconfiguration message, or a stop indication, or a handover indication is received at an IAB node. In step 504, the IAB node that received the message sends a stop indication or a handover indication to a child node. It should be understood that the child node can be another IAB node, a UE, or a MT. In step 506, the node that received the stop indication or handover indication stops data forwarding to the IAB node. In an embodiment, the IAB node is a IAB donor central unit (CU).

In an embodiment, the access or intermediate IAB node buffers data packets received from UE and transmit the buffered packets on the target path. In an embodiment, the IAB node starts to buffer data packets upon receiving a stop indication (or handover initiation indication) from parent node, and the IAB node sends the stop indication to the child MT upon receiving the stop indication from parent node. In an embodiment, the migrating IAB node sends the stop indication upon receiving HO CMD.

In an embodiment, UL transmission resumes upon the IAB node receiving a resume indication (or handover complete indication) from parent node after the IAB node receives an updated F1-U UL mapping configuration. In an embodiment, this option is used when the updated F1-U UL mapping configuration is sent via a HO CMD, where the IAB node sends the resume indication to child MT upon receiving the resume indication from parent node and the migrating IAB node sends the resume indication upon target path is ready.

Figure 6:
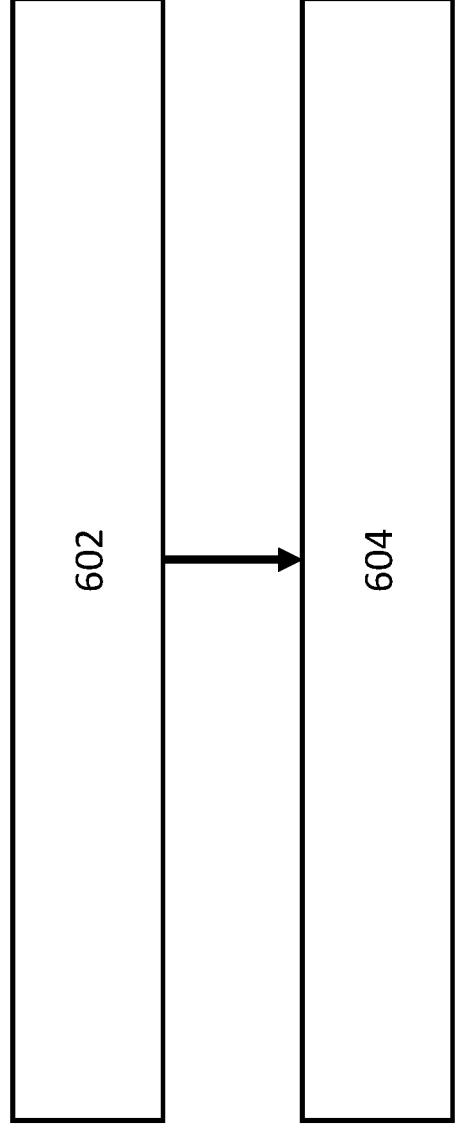
FIG. 6 illustrates an embodiment where the UL data transfer of a descendant node or UE are managed.

FIG. 6 illustrates an embodiment where the UL data transfer of a descendant node or UE are managed. In step 602, an IAB node receives a stop indication or a handover indication in a F1AP message. In an embodiment, the F1AP message includes a RRCreconfiguration message. In step 604, the IAB stops the forwarding of UE data packets. In an embodiment, the DL RRC MESSAGE TRANSFER is an example of F1AP message.

In an embodiment, the UE shall send RRCreconfigurationcomplete and use the new ciphering key after receiving HO cmd. In a further embodiment, the migrating IAB node may still connect to source parent node and, the IAB node shall stop forwarding RRCreconfigurationcomplete message and packets ciphered with new keys on the source path, i.e., stop UL data forwarding and buffer the data packets received for UE in order to avoid RRCreconfigurationcomplete/SCTP/F1 setup messages and UE packets ciphered with new keys are delivered to source donor CU. In an embodiment, the access IAB node stops the corresponding UE's UL data forwarding upon receiving stop indication in DL RRC MESSAGE TRANSFER message which includes HO CMD for the UE.

Figure 7:
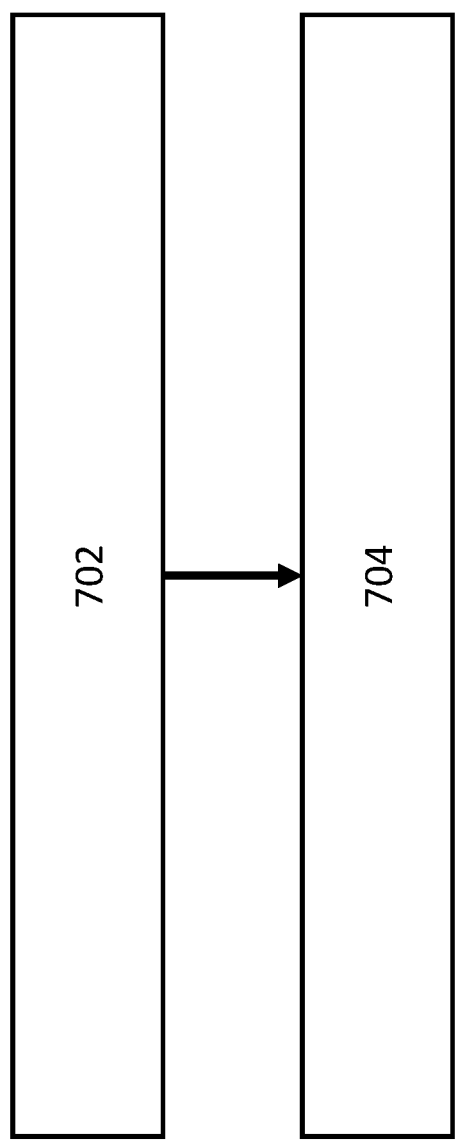
FIG. 7 illustrates another embodiment that manages retransmission of packets.

FIG. 7 illustrates another embodiment that manages retransmission of packets. In step 702, a flag in a Backhaul Adaption Protocol (BAP) header is included in a UE packet. In step 704, the UE packet is transmitted to the next hop. The flag indicates that the next hop ignores the BAP header or selects any next hop or any egress backhaul (BH) Radio Link Control (RLC) channel to deliver the UE packets.

In an embodiment, the BAP address and the BAP routing ID are changed after migration of an IAB node from one parent node to another parent node, and the IAB node and donor DU on the target path are unable to identify the BAP routing ID contained in the BAP header of the re-transmitted packets and may discard these packets. In an embodiment, to address this, the migrating IAB node includes a flag in BAP header of the re-transmitted packets, and the parent IAB node ignores the BAP header or selects any next hop or selects any egress BH RLC channel to deliver the packets if the flag exists.

Figure 8:
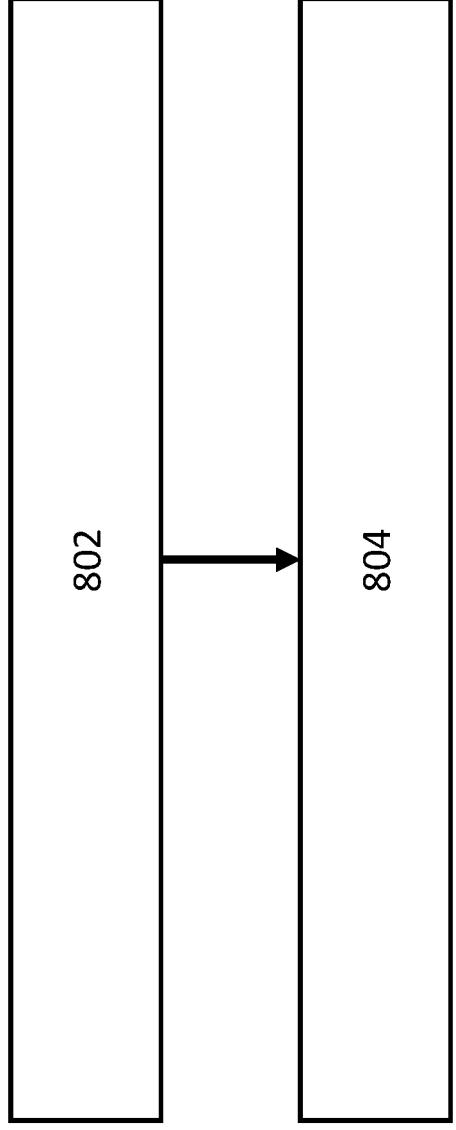
FIG. 8 illustrates an embodiment where a node determines the packets to be retransmitted.

FIG. 8 illustrates an embodiment where a node determines the packets to be retransmitted. In step 802, an IAB node sends UL delivery status information to a child node. In an embodiment, the UL delivery status information comprises sequence numbers (SNs) of the packets from the child nodes that have not been sent to, nor have they been confirmed by, the IAB node's parent node. In an embodiment, the UL delivery status information is sent via a BAP sublayer control PDU or BAP sublayer data PDU or a RLC sublayer control PDU. In an embodiment, the UL delivery status information includes at least one of a RLC SN, a RLC channel ID or Logical Channel (LC) ID, a backhaul (BH) RLC channel ID, or a BAP sublayer SN. In step 804, the IAB node sends packets that need to be retransmitted to the child node. In an embodiment, the packets contain at least a source IAB node's BAP address, an access node's BAP address and a flag in a BAP subheader.

In an embodiment, the IAB access IAB node determines the packets that need to be retransmitted. The migrating/descendant IAB node sends the UL delivery status information (e.g. SNs of packets which are received from child MT and not confirmed or not sent) to a child MT. Upon the reception of UL delivery status information, the child IAB node sends the SNs of packets which are received from its child MT and not confirmed by RLC ACK to its child MT as well. The UL delivery status information could be sent via BAP layer (e.g. BAP control PDU) or RLC layer (e.g. RLC control PDU), and includes at least one of the following: RLC SN in the ingress link; RLC channel ID or LCID; BAP layer SN.

In an embodiment, the migrating/descendant IAB node sends SNs and packets which needs to be re-transmitted on the target path to the descendant node. The access IAB node's BAP address is also contained in the BAP header. In an embodiment, a retransmission flag needs to be contained in the BAP header. Any BH RLC channel or channel by specific implementation or channel via CU configuration are used.

Figure 9:
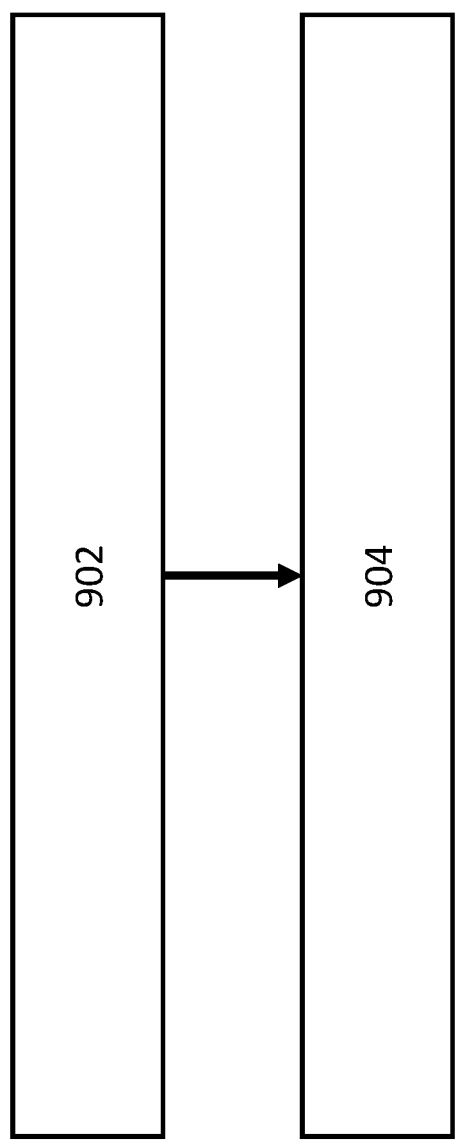
FIG. 9 illustrates an embodiment illustrating the retransmission of packets.

FIG. 9 illustrates an embodiment illustrating the retransmission of packets. In step 902, an IAB node receives an UL transfer status from a donor IAB. In an embodiment, the UL transfer status is transmitted after the IAB donor CU receives a SN transfer message. In step 904, the IAB node retransmits packets according to the UL transfer status. In an embodiment, the UL transfer status contains at least one of the receive status of the UL PDCP SDU and UL COUNT value of the first missing UL SDU.

In an embodiment, after receiving the SN status transfer message (which can contain the Status Of PDCP SDU and UL COUNT Value per UE DRB) sent from source donor CU, a target donor CU sends the UL transfer status to the access IAB node. The access IAB node could determine which packets need to be retransmitted according to the UL transfer status received from target donor CU.

Figure 10:
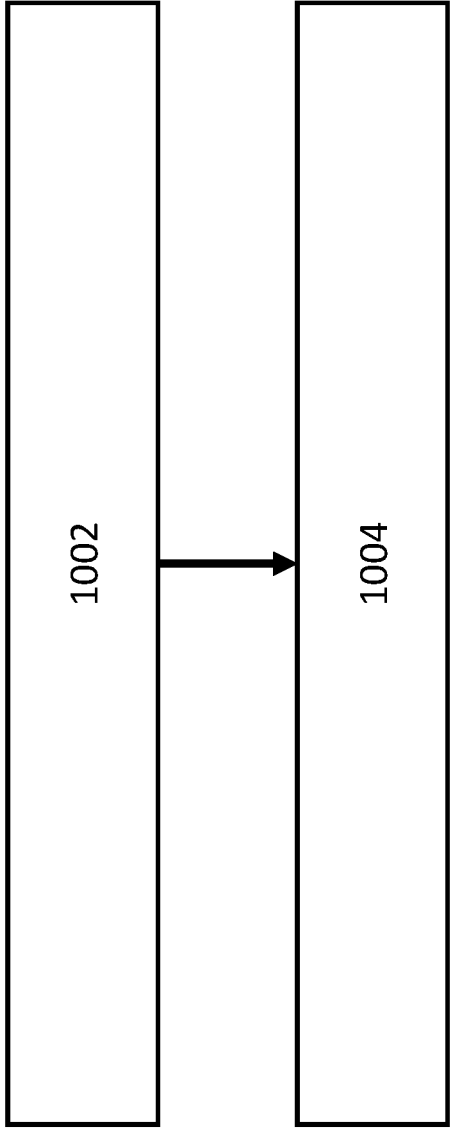
FIG. 10 illustrates an embodiment where packets that need to be forwarded from a target to a source donor are identified.

FIG. 10 illustrates an embodiment where packets that need to be forwarded from a target to a source donor are identified. In step 1002, an IAB node includes a flag in the GTP-U header of one or more packets. In an embodiment, the flag indicates that the packets need to be forwarded to the source donor, e.g., to a particular donor CU. In step 1004, the IAB node transmits the packets to the next hop.

Figure 11:
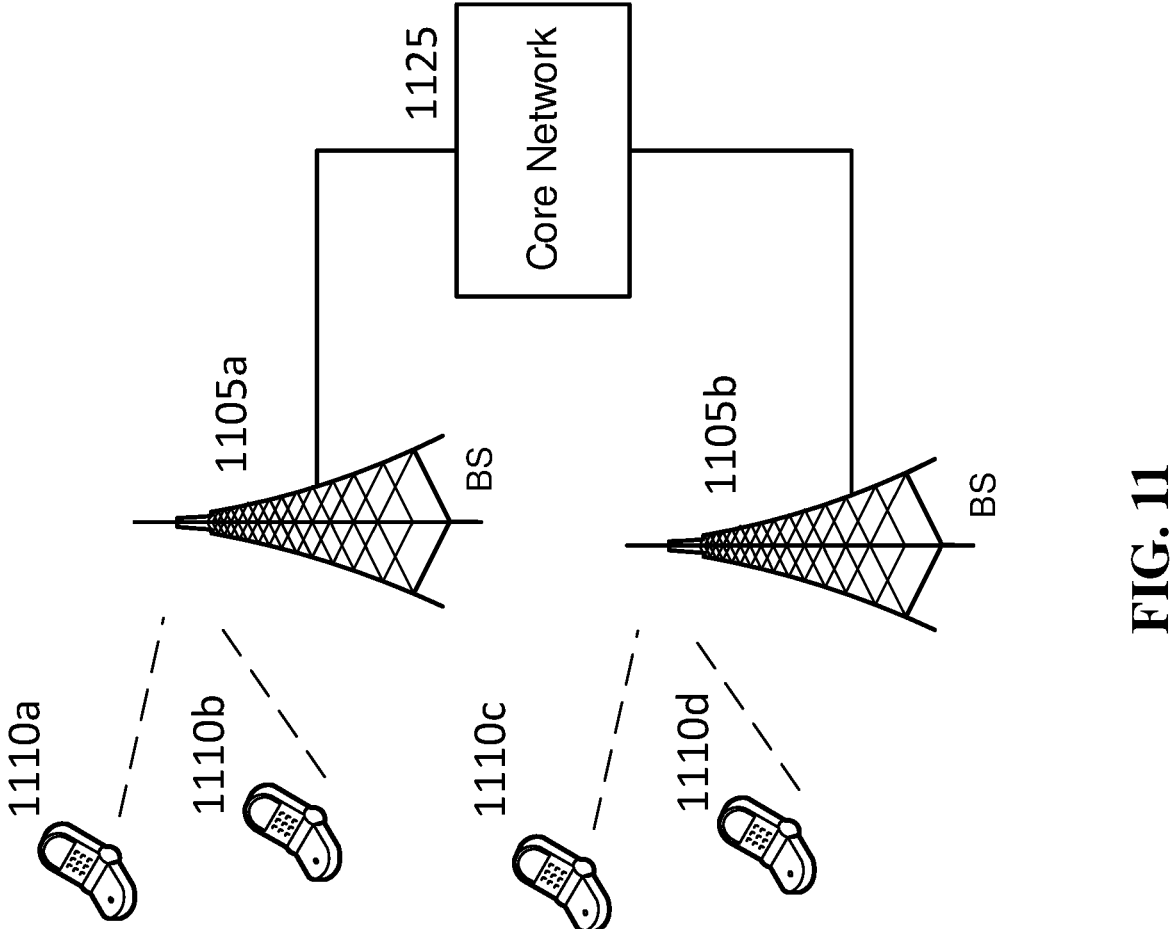
FIG. 11 shows an example of a wireless communication system where techniques in accordance with one or more embodiments of the present technology can be applied.
Figure 11:
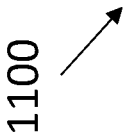

FIG. 11 illustrates an embodiment where packets that need to be forwarded are identified. In step 1102, an IAB node receives a stop indication in an F1AP message. In step 1104, an IAB node transmits an end marker via a GTP-U layer or a FLAP message to a target donor CU. In an embodiment, the target IAB donor (CU) sends the end marker to the source IAB donor (CU).

In an embodiment, the target donor CU identifies the packets that need to be forwarded to source donor CU via an end marker. The UE applies the a new ciphering key after receiving HO CMD, and the access IAB node sends an end maker after receiving DL RRC MESSAGE TRANSFER message (which includes HO CMD for the UE). Target donor CU forwards packets received from migrating/descendant node to S-donor CU until it receives end marker. In an embodiment, the donor CU shall be aware of the end marker. In an embodiment, the end marker is sent per UE bearer or per UE. In an embodiment, the T-donor CU sends the end marker to the S-donor CU as well, and then the S-donor CU sends the SN status transfer message (which includes UL transfer status) to T-donor CU upon reception of the end marker.

In an embodiment, UL data transfer of descendant node and UE continue during migration by an IAB node sending a stop/resume indication to child IAB-MT. In an embodiment, UL data transfer of descendant node and UE continue during migration by a including a stop indication in a DL RRC MESSAGE TRANSFER message.

In an embodiment, the BAP address and BAP routing ID changed after migration, and the access IAB node includes a flag in BAP header of the packets, where the IAB node ignores the BAP header and selects any next hop or selects any egress BH RLC channel to deliver the packets if the flag exists.

In an embodiment, the access IAB node determines the packets that need to be re-transmitted or transmitted, by receiving the UL delivery status information (e.g. SNs of packets which are received from child MT and not confirmed or not sent) from the migrating IAB node and/or intermediate node. In an embodiment, the access IAB node determines the packets that need to be re-transmitted or transmitted, by sending SNs and packets which needs to be re-transmitted on the target path to child IAB-MT. In an embodiment, the access IAB node determines the packets that need to be re-transmitted or transmitted, by containing the source IAB node's BAP address or access IAB node's BAP address in the BAP header. In an embodiment, a retransmission flag can be contained in the BAP header. In an embodiment, the access IAB node determines the packets that need to be re-transmitted or transmitted, where the donor CU configures traffic mapping for packets needs to be retransmitted via F1AP message. In an embodiment, the access IAB node determines the packets that need to be re-transmitted or transmitted, after receiving SN status transfer message (contains Status Of PDCP SDU and UL COUNT Value per UE DRB) sent from source donor CU, target donor CU sends the UL transfer status to the access IAB node via F1.

In an embodiment, the target donor CU identifies which packets needs to be forwarded to source donor CU by having a flag/end marker is contained in GTP-U header or the T-donor CU send end marker to S-donor CU so that, after receiving the end marker, the source donor CU could be made aware that there is no more data forwarding from the target donor CU. In an embodiment, the access IAB node includes the flag/end marker in the GTP-U header.

It should be understood that, while some embodiments describe the transmission of certain data to a node in the IAB deployment, that the disclosure envisions the receipt and further transmission. For instance, where an IAB node is described as transmitting a piece of data intended for a UE, it should be understood that any number of child IAB nodes exist in between the IAB node transmitting the data and the UE. It should be understood that those IAB nodes likewise transmit that data. The same applies for any nodes in between the path of an IAB node transmitting data and the IAB donor CU.

FIG. 11 shows an example of a wireless communication system 1100 where techniques in accordance with one or more embodiments of the present technology can be applied. A wireless communication system 1100 can include one or more base stations (BSs) 1105a, 1105b, one or more wireless devices 1110a, 1110b, 1110c, 1110d, and a core network 1125. A base station 1105a, 1105b can provide wireless service to wireless devices 1110a, 1110b, 1110c and 1110d in one or more wireless sectors. In some implementations, a base station 1105a, 1105b includes directional antennas to produce two or more directional beams to provide wireless coverage in different sectors. As should be understood, with reference to FIGS. 1 to 4, the base stations can be a series of IAB nodes.

The core network 1125 can communicate with one or more base stations 1105a, 1105b. The core network 1125 provides connectivity with other wireless communication systems and wired communication systems. The core network may include one or more service subscription databases to store information related to the subscribed wireless devices 1110a, 1110b, 1110c, and 1110d. A first base station 1105a can provide wireless service based on a first radio access technology, whereas a second base station 1105b can provide wireless service based on a second radio access technology. The base stations 1105a and 1105b may be co-located or may be separately installed in the field according to the deployment scenario. The wireless devices 1110a, 1110b, 1110c, and 1110d can support multiple different radio access technologies. The techniques and embodiments described in the present document may be implemented by the base stations of wireless devices described in the present document.

Figure 12:
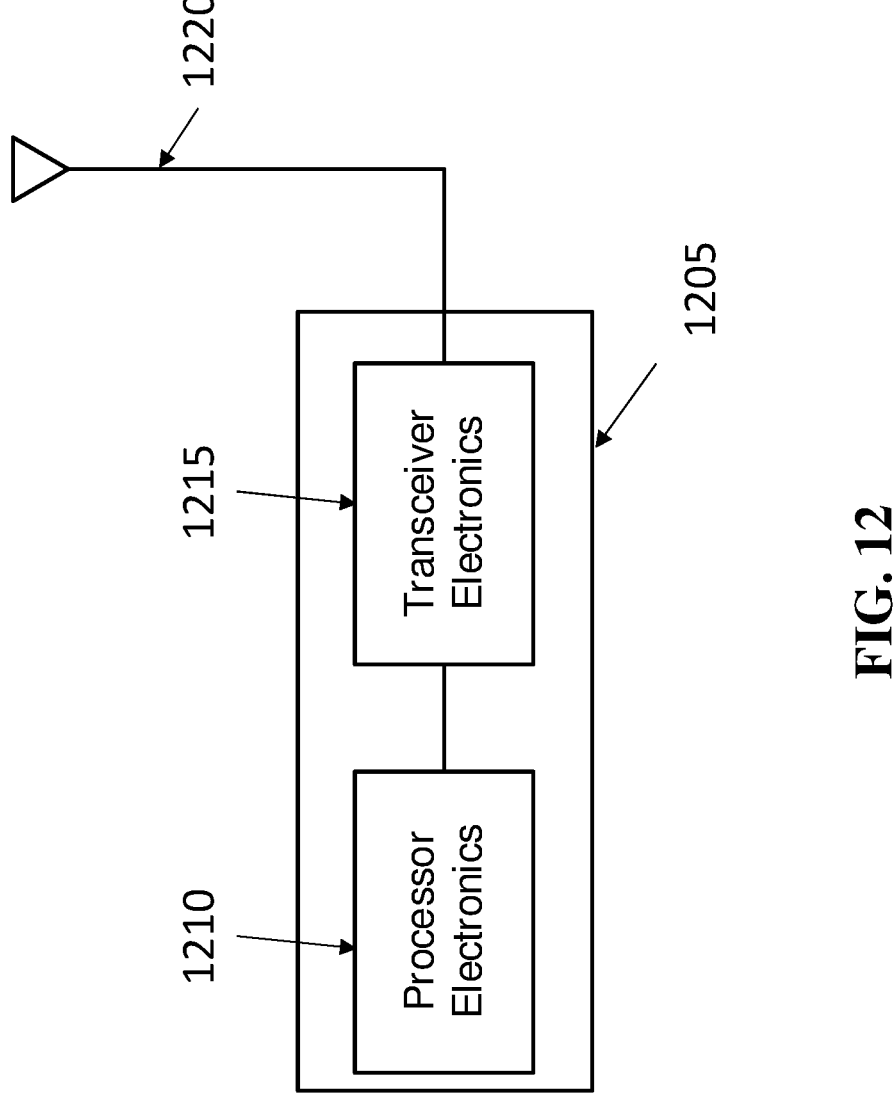
FIG. 12 is a block diagram representation of a portion of a radio station in accordance with one or more embodiments of the present technology can be applied.

FIG. 12 is a block diagram representation of a portion of a radio station in accordance with one or more embodiments of the present technology can be applied. A radio station 1205 such as a base station or a wireless device (or UE) or MT can include processor electronics 1210 such as a microprocessor that implements one or more of the wireless techniques presented in this document. The radio station 1205 can include transceiver electronics 1215 to send and/or receive wireless signals over one or more communication interfaces such as antenna 1220. The radio station 1205 can include other communication interfaces for transmitting and receiving data. Radio station 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the radio station 1205. In some embodiments, the radio station 1205 may be configured to perform the methods described herein.

It will be appreciated that the present document discloses techniques that can be embodied in various embodiments of IAB deployments. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. An information transmission method comprising:
    sending, by an integrated access and backhaul (IAB) node, uplink (UL) delivery status information to at a child node, wherein the UL delivery status information comprises sequence numbers (SNs) of at least one packet that is received from the child node, wherein the at least one packet has not been transmitted to a parent node of the IAB node or has not be confirmed as received by the parent node of the IAB node; and
    sending, by the IAB node, the at least one pack that needs to be re-transmitted to the child node, wherein the at least one packet contains at least one of a first backhaul adaption protocol, BAP, address of a source IAB node, a second BAP address of an access node, or a flag in a BAP subheader.

2. The method according to claim 1, wherein the UL delivery status information is sent via a Backhaul Adaptation Protocol (BAP) sublayer control Protocol Data Unit (PDU) or BAP sublayer data PDU or a Radio Link Control (RLC) sublayer control PDU.

3. The method according to claim 1, wherein the UL delivery status information includes at least one of a RLC SN, a RLC channel ID or Logical Channel (LC) ID, a backhaul BH) RLC channel ID, or a BAP sublayer SN.

4. The method according to claim 1, wherein a backhaul RLC channel for transmitting the at least one packet is configured by a donor centralized unit (CU).

5. A wireless communication apparatus comprising:
    one or more processors; and

a memory, wherein the one or more processors are con-
figured to execute a program from the memory to cause
the wireless communication apparatus to perform:
sending, by an integrated access and backhaul (IAB)
node, uplink (UL) delivery status information a child
node, wherein the UL delivery status information
comprises sequence numbers (SNs) of at least one
packet that is received from the child node, wherein
the at least one packet has not been transmitted to a
parent node of the IAB node or has not be confirmed
as received by the parent node of the IAB node; and
sending, by the IAB node, the at least one pack that
needs to be re-transmitted to the child node, wherein
the at least one packet contains at least one of a first
backhaul adaption protocol, BAP, address of a source
IAB node, a second BAP address of an access node,
or a flag in a BAP subheader.

6. The apparatus of claim 5, wherein the UL delivery
status information is sent via a Backhaul Adaptation Proto-
col (BAP) sublayer control Protocol Data Unit (PDU) or
BAP sublayer data PDU or a Radio Link Control (RLC)
sublayer control PDU.

7. The apparatus of claim 5, wherein the UL delivery
status information includes at least one of a RLC SN, a RLC
channel ID or Logical Channel (LC) ID, a backhaul (BH)
RLC channel ID, or a BAP sublayer SN.

\* \* \* \* \*